(12) United States Patent
Satterthwaite et al.

(10) Patent No.: US 11,192,452 B2
(45) Date of Patent: Dec. 7, 2021

(54) ELECTRIC VEHICLE BRAKING SYSTEM, METHOD, CONTROLLER AND COMPUTER PROGRAM PRODUCT

(71) Applicant: Jaguar Land Rover Limited, Coventry (GB)

(72) Inventors: Anthony Satterthwaite, Coventry (GB); Matthew Hancock, Coventry (GB); Simon Hegarty, Coventry (GB); Nicolas Godlewski, Coventry (GB); Zahir Ismail, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 466 days.

(21) Appl. No.: 15/757,602

(22) PCT Filed: Sep. 7, 2016

(86) PCT No.: PCT/EP2016/071075
§ 371 (c)(1),
(2) Date: Mar. 5, 2018

(87) PCT Pub. No.: WO2017/042209
PCT Pub. Date: Mar. 16, 2017

(65) Prior Publication Data
US 2018/0244159 A1    Aug. 30, 2018

(30) Foreign Application Priority Data

Sep. 7, 2015    (GB) ...................................... 1515813

(51) Int. Cl.
*B60L 7/26*    (2006.01)
*B60T 8/1766*    (2006.01)
(Continued)

(52) U.S. Cl.
CPC .................. *B60L 7/26* (2013.01); *B60L 7/18* (2013.01); *B60L 15/2009* (2013.01);
(Continued)

(58) Field of Classification Search
CPC .......... B60L 7/18; B60L 7/26; B60L 15/2009; B60T 8/172; B60T 8/17551;
(Continued)

(56) References Cited

U.S. PATENT DOCUMENTS 4,657,310 A * 4/1987 Klein .................... B60T 8/1764
303/113.5
5,148,883 A    9/1992 Tanaka et al.
(Continued)

FOREIGN PATENT DOCUMENTS

DE    10 2013 209 175 A1    11/2014
EP    0 537 874 A1    4/1993
(Continued)

OTHER PUBLICATIONS

Patents Act 1977: Combined Search and Examination Report under Sections 17 and 18(3), UKIPO Application No. GB1515813.2, dated Mar. 15, 2016, 8 pp.
(Continued)

*Primary Examiner* — Frederick M Brushaber
(74) *Attorney, Agent, or Firm* — McCoy Russell LLP (57) ABSTRACT

The present invention relates to a controller (27) for a braking system for a vehicle (10). The braking system has an independent generator (20, 22) on respective front and rear axles (16, 18). The controller (27) comprises an input (44) arranged to monitor a vehicle condition and an operating condition of the generators (20, 22). The controller (27) also comprises a processing means (46) arranged to determine a brake force distribution range between the front and rear axles (16, 18) based on the vehicle condition, and in
(Continued)

response to a braking demand and the operating condition of the generators (20, 22), calculate a brake force distribution within the brake force distribution range. In addition, the controller (27) comprises an output (50) arranged to control the generators in accordance with the calculated brake force distribution.

10 Claims, 8 Drawing Sheets

(51) Int. Cl.
| | |
|---|---|
| *B60T 8/172* | (2006.01) |
| *B60T 8/1755* | (2006.01) |
| *B60T 8/30* | (2006.01) |
| *B60T 8/32* | (2006.01) |
| *B60T 8/58* | (2006.01) |
| *B60L 7/18* | (2006.01) |
| *B60L 15/20* | (2006.01) |

(52) U.S. Cl.
CPC ............ *B60T 8/172* (2013.01); *B60T 8/1766* (2013.01); *B60T 8/17551* (2013.01); *B60T 8/17552* (2013.01); *B60T 8/30* (2013.01); *B60T 8/3205* (2013.01); *B60T 8/58* (2013.01); *B60T 2210/12* (2013.01); *B60T 2220/04* (2013.01); *B60T 2250/03* (2013.01); *B60T 2270/60* (2013.01); *B60T 2270/604* (2013.01); *B60T 2270/613* (2013.01); *Y02T 10/64* (2013.01); *Y02T 10/72* (2013.01)

(58) Field of Classification Search
CPC ...... B60T 8/17552; B60T 8/1766; B60T 8/30; B60T 8/3205; B60T 8/58; B60T 2210/12; B60T 2220/04; B60T 2250/03; B60T 2270/60; B60T 2270/604; B60T 2270/613; B60T 8/17; Y02T 10/645; Y02T 10/646; Y02T 10/7275; Y02T 10/64; Y02T 10/72; B60W 10/08; B60W 10/184

See application file for complete search history.

(56) References Cited

U.S. PATENT DOCUMENTS

| | | | | | |
|---|---|---|---|---|---|
| 5,219,210 | A | * | 6/1993 | Maehara | ............... B60T 8/1764 188/349 |
| 5,632,530 | A | * | 5/1997 | Brearley | ................... B60T 8/00 303/198 |
| 5,902,019 | A | * | 5/1999 | Maron | .................... B60T 7/042 303/113.4 |
| 6,053,583 | A | * | 4/2000 | Izumi | ..................... B60T 8/175 303/150 |
| 6,076,898 | A | * | 6/2000 | Ota | .......................... B60T 7/122 303/139 |
| 6,089,679 | A | * | 7/2000 | Kushi | ..................... B60T 8/266 303/113.5 |
| 6,692,090 | B1 | * | 2/2004 | Heyn | ........................ B60T 7/12 303/139 |
| 6,873,898 | B1 | * | 3/2005 | Kostadina | ............ B60T 8/1755 701/91 |
| 7,077,484 | B2 | | 7/2006 | Sasaki et al. | |
| 9,586,486 | B2 | * | 3/2017 | Kunz | ........................ B60L 7/26 |
| 2002/0030408 | A1 | | 3/2002 | Niwa et al. | |
| 2003/0062770 | A1 | | 4/2003 | Sasaki et al. | |
| 2004/0070270 | A1 | | 4/2004 | Gunji | |
| 2005/0099146 | A1 | | 5/2005 | Nishikawa et al. | |
| 2006/0055239 | A1 | | 3/2006 | Crombez et al. | |
| 2014/0333123 | A1 | * | 11/2014 | Kunz | ....................... B60L 7/26 303/3 |
| 2015/0274033 | A1 | | 10/2015 | Katsuyama et al. | |
| 2016/0129897 | A1 | * | 5/2016 | Feinauer | ................ B60T 7/042 701/70 |

FOREIGN PATENT DOCUMENTS

| | | | | |
|---|---|---|---|---|
| EP | 2 127 974 | A1 | | 12/2009 |
| EP | 2 777 980 | A1 | | 9/2014 |
| GN | 103241127 | A | | 8/2013 |
| GN | 103991384 | A | | 8/2014 |
| JP | 2006-34053 | A | | 2/2006 |
| JP | 2010-178602 | A | | 8/2010 |
| JP | 2010178602 | A | * 8/2010 | ......... Y02T 10/7077 |
| JP | 2011-188557 | A | | 9/2011 |
| JP | 2012-175893 | A | | 9/2012 |
| WO | WO 2014/054148 | A1 | | 4/2014 |

OTHER PUBLICATIONS

Patents Act 1977: Combined Search and Examination Report under Sections 17 and 18(3), UKIPO Application No. GB1615174.8, dated Feb. 15, 2017, 6 pp.

International Search Report and Written Opinion of the International Searching Authority, International Application No. PCT/EP2016/071075, dated Nov. 22, 2016, 13 pp.

\* cited by examiner

ELECTRIC VEHICLE BRAKING SYSTEM, METHOD, CONTROLLER AND COMPUTER PROGRAM PRODUCT

RELATED APPLICATIONS

This application is a 35 U.S.C. § 371 national stage application of PCT Application No. PCT/EP2016/071075, filed on Sep. 7, 2016, which claims priority from Great Britain Patent Application No. GB1515813.2, filed on Sep. 7, 2015, the contents of which are incorporated herein by reference in their entireties. The above-referenced PCT International Application was published in the English language as International Publication No. WO 2017/042209 A1 on Mar. 16, 2017.

TECHNICAL FIELD

The invention relates to a regenerative braking system and more particularly, but not exclusive, to those regenerative braking systems of an electric or hybrid electric vehicle having an independent generator on each axle. Aspects of the invention relate to a controller for a braking system, a braking system, a vehicle, and a method of operating a braking system of a vehicle.

BACKGROUND

A vehicle can be decelerated, or retarded, using a braking system. Typically a braking system includes a hydraulic braking system. In more recent times, braking systems have also incorporated regenerative braking systems.

A hydraulic braking system typically includes disc brakes for decelerating each wheel of the vehicle. These disc brakes include a brake disc, or rotor, mounted to a side shaft of the vehicle and a pair of brake pads supported in a caliper to position the brake pads either side of the brake disc. A hydraulic circuit is provided to apply pressure to each brake pad in response to a brake command from a driver of the vehicle.

A typical regenerative braking system includes an electric machine linked to one or both vehicle axles. More particularly, there exist regenerative braking systems which include an independent electric machine on each axle of the vehicle. In normal driving, the electric machine forms the motor arranged to convert electrical energy into mechanical energy for turning the shafts of the axle. However, during regenerative braking, the process is reversed and the shaft is decelerated by resistance in using the electric machine as a generator to convert the mechanical energy of the shaft rotation into electrical energy. This electrical energy can be stored in a vehicle battery for subsequent supply to the motor. Such regenerative braking systems allow for prolonged vehicle range.

Typical braking systems apply a fixed brake force distribution between front and rear axles. In this way, the energy recovered during regenerative braking is not optimised since during the life of the vehicle, various components, such as the electric machines, may become temporarily de-rated, leading to non-optimal energy generation. For instance, a front biased brake force distribution where the front generator is de-rated, would lead to inefficient energy generation. However, varying the brake force distribution between the front and rear axles may cause problems with vehicle stability.

It is an object of the present invention to address disadvantages associated with the prior art.

SUMMARY OF THE INVENTION

Aspects and embodiments of the invention provide a controller for a braking system for a vehicle, a braking system, a vehicle, and a method of decelerating a vehicle as claimed in the appended claims.

According to an aspect of the present invention there is provided a controller for a braking system for a vehicle, the braking system having an independent generator on respective front and rear axles, and the controller comprising; an input arranged to monitor a vehicle condition and an operating condition of the or each generator; a processing means arranged to determine a brake force distribution range between the front and rear axles based on the vehicle condition, and in response to a braking demand and the operating condition of the generators, and calculate a brake force distribution within the brake force distribution range; and an output arranged to control the generators in accordance with the brake force distribution.

In this way, the braking distribution can be changed to accommodate changes in generator condition as well as vehicle stability as opposed to merely applying fixed distribution so as to improve energy generation. Improving energy generation in this way ultimately improves a range of the vehicle, which for an electric vehicle is hugely beneficial due to range and charging time being such important factors. In the case of a hybrid vehicle, improving energy generation also reduces emissions.

The vehicle condition may be a parameter relating to vehicle stability, wherein the potential brake force distribution range reduces as the parameter relating to vehicle stability falls.

The brake force distribution range may be arranged to taper and converge at an installed hydraulic brake force distribution.

The installed hydraulic brake force distribution may be distributed with about 70% of a total braking force distributed to the front axle and about 30% of the total braking force distributed to the rear axle.

The output may be arranged to configure the braking system to retard the vehicle by hydraulic braking in response to the vehicle condition being associated with a stability event. By stability event we mean any event where stability is compromised such as where the surface adhesion has been exceeded. Using hydraulic braking in these cases is more reliable from a stability perspective, for instance anti-lock braking can be utilized.

The vehicle condition is thus used to determine a brake force distribution range which defines maximum braking distribution threshold associated with the, or each, axle. By maximum braking distribution threshold we mean the braking distribution above which the surface adhesion is exceeded. In this way, the braking force of the respective axle will not exceed a maximum force associated with the stability of the vehicle so as not to over-steer or under-steer.

In an embodiment, the output may be arranged to send a signal to configure the braking system to retard the vehicle at least partially by hydraulic braking in response to the available regenerative braking being insufficient for the current braking demand. In this way, the vehicle can be decelerated as requested even though the braking capacity for regenerative braking is not sufficient for the braking demand. In a case where both hydraulic braking and regenerative braking are applied simultaneously, energy generation can be maximized by utilizing the maximum available capacity for regenerative braking with the remaining braking force being handled hydraulically.

In an embodiment, the installed hydraulic brake force distribution may be distributed with about 70% of a total braking force distributed to the front axle and about 30% of the total braking force distributed to the rear axle. This distribution is optimum for hydraulic braking in terms of minimum braking distance and time on a nominal road surface In an embodiment, the vehicle condition may be based on one or more parameters selected from a list including longitudinal acceleration, lateral acceleration, yaw rate, driving surface gradient, weight distribution, surface-tyre friction coefficient, and a driver brake request. Longitudinal acceleration can be used to bias the braking distribution to an axis depending on the direction of acceleration. For instance, in a braking event, weight shifts to the front axle. Generators are most efficient at higher capacities. Thus the braking distribution can be shifted more to the front axle in this case to maximise energy recovery. Lateral acceleration can be used in a similar way during a turn where a shift in weight may occur. Weight distribution can be used similarly but for cases other than acceleration events, such as constant speed cruising. Yaw rate can be used in a similar way. Weight distribution can be estimated in several ways such as by using tyre pressure sensors. Surface gradient and surface-tyre friction coefficient can be estimated using ancillary components of the vehicle, such as a radar system and a terrain detection system respectively. Knowledge of these parameters will aid in predicting the vehicle's response to manoeuvres. For instance, a vehicle ascending a positive gradient will have weight shifted to the rear axle so the braking distribution can be biased to the rear axle in the event of a braking event. A vehicle descending a negative gradient may require braking and so the generators can be used accordingly, and biased forwards as appropriate. Similarly, the braking magnitude in a braking event can be used.

In an embodiment, the generator operating condition may be selected from list including generator efficiency, generator temperature and a health state of the generator. Generator efficiency may be calculated compared to expected levels and is important since a generator having low efficiency will not harvest maximum possible energy so the braking distribution can be selected to bias towards the most efficient generator. Temperature and health state can be used to produce efficiency data for the generators to yield similar results.

The controller may be operable to determine the brake force distribution to maximize recovery of energy during braking.

According to a further aspect of the present invention, there is provided a braking system comprising independent generators on respective front and rear axles for regenerative braking and the aforementioned controller.

In an embodiment, the braking system may comprise provisions for hydraulic braking.

According to a further aspect of the present invention, there is provided a vehicle comprising the aforementioned braking system.

According to a further aspect of the present invention, there is provided a method of operating a braking system of a vehicle, the method comprising;
    monitoring a vehicle condition and an operating condition of the or each generator;
    determining a potential brake force distribution range between the front and rear axles based on the vehicle condition; and
    in response to a braking demand and the operating condition of the generators;
    calculating an optimum regenerative brake force distribution within the brake force distribution range; and
    controlling the generators in accordance with that distribution.

According to a further aspect of the present invention, there is provided a computer storage medium comprising computer-readable instructions for a computer to carry out the aforementioned method.

According to a further aspect of the present invention, there is provided a non-transitory computer-readable storage medium storing executable computer program instructions to implement the aforementioned method.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
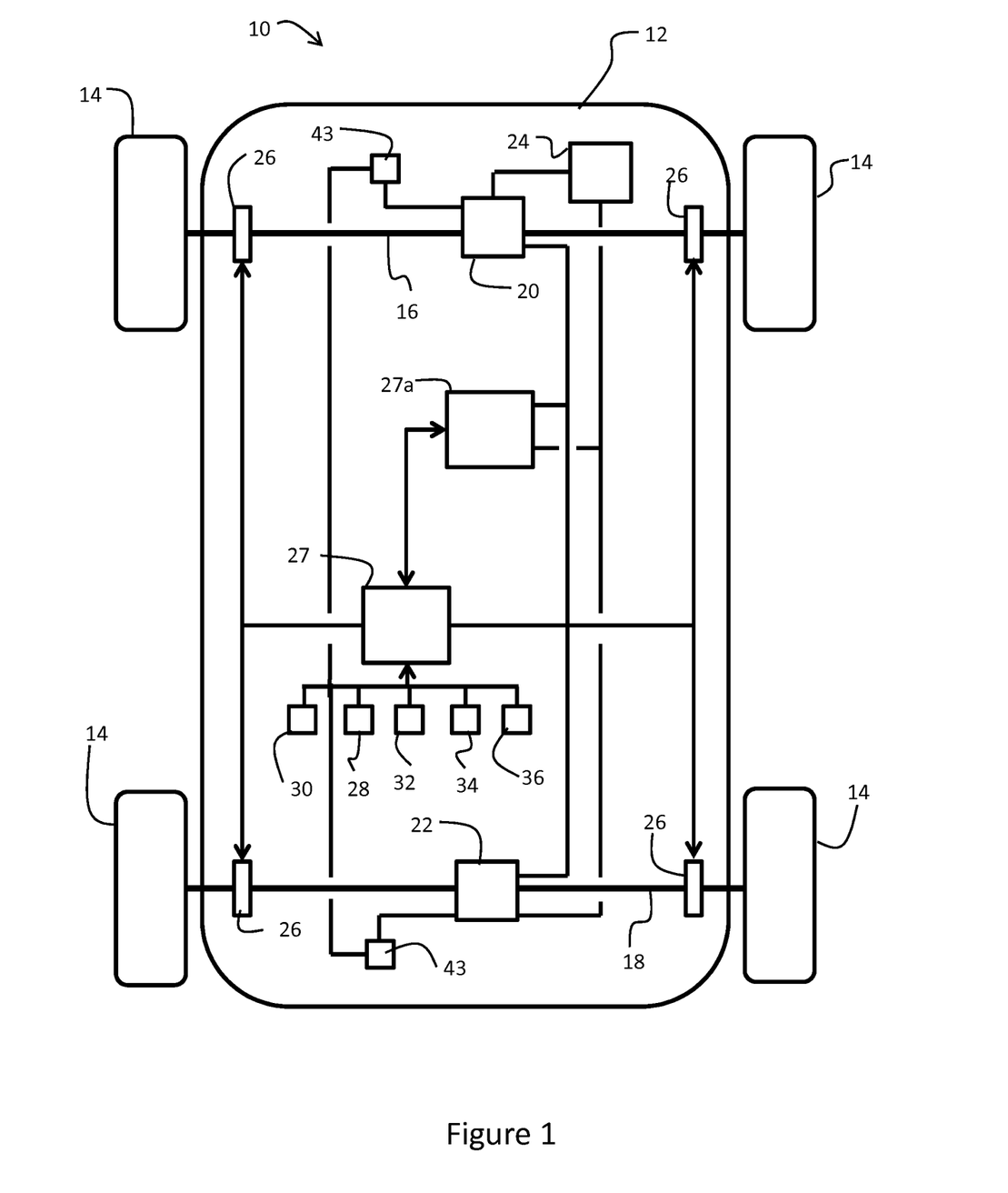
FIG. 1 shows a schematic view of a vehicle including a braking system according to an embodiment of the present invention.

With reference to FIG. 1, a vehicle 10 includes a body 12 driven by a set of wheels 14. The wheels 14 support the body on respective front and rear axles 16, 18.

The vehicle in this embodiment is an electric vehicle, though this invention is also applicable to hybrid electric vehicles. The electric vehicle 10 includes a front machine 20 on the front axle 16 and a rear machine 22 on the rear axle 18. Alternatively, the vehicle 10 may include more than one machine on each axle 16, 18, for instance one machine on each side shaft, or expressed differently, one machine per wheel. Each machine is operable to act as a motor for converting electrical energy into kinetic energy for powering the respective axle. In addition, each machine is operable to act as a generator for converting kinetic energy recovered during a braking event into electrical energy. The electrical energy is stored in a battery 24.

The vehicle 10 also includes hydraulic braking provisions in the form of hydraulically operated disc brakes 26. There are four disc brakes in this embodiment, each being attached to a side shaft of one of the axles.

The vehicle 10 also includes a first controller 27a for controlling the electric machines 20, 22 as motors or as generators. In addition, the vehicle 10 includes a second controller 27 for configuring the disc brakes 26 for hydraulic braking and performing such functions as an anti-lock braking system (ABS). Although, these controllers 27, 27a are shown graphically as separate entities, it is also possible to utilize a single controller but performing two functions, namely those functions specific to each of the individual controllers 27, 27a specified above. Accordingly, the term controller can be used in its singular form or plural form in this description without limiting the description to any particular configuration.

Various sensors are provided and used as inputs to the controller 27. These sensors allow the controller to monitor various vehicle conditions. These sensors include driving control sensors 28, a wheel speed sensors (one per wheel) 30, a global positioning system (GPS) 32, a three axis accelerometer 34, and a yaw rate sensor 36.

Figure 2:
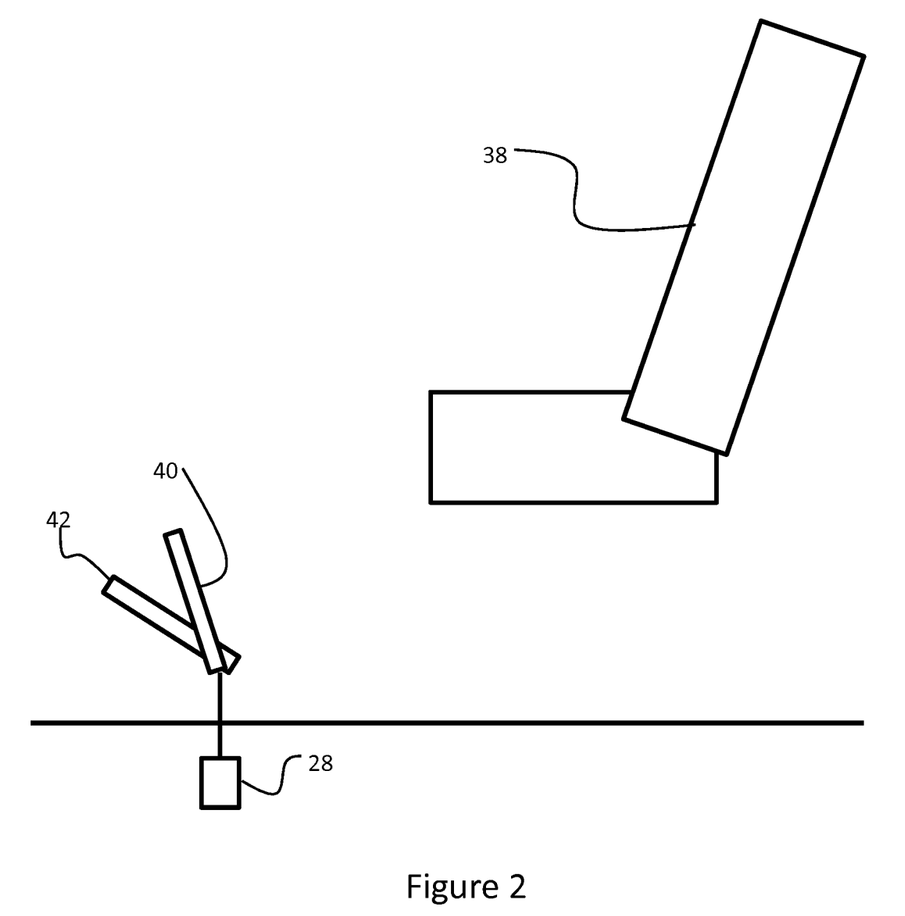
FIG. 2 shows a schematic of a driver's section of the vehicle from FIG. 1.

With reference to FIG. 2, which shows a driver's seat 38, the driving control sensor 28 is shown coupled to an accelerator pedal 40 and a brake pedal 42. The driving control sensor works by monitoring the angular displacement of each pedal using for example a Hall Effect sensor. In this way, the magnitude of braking and acceleration demands can be monitored by measuring the angular displacement and rate of change of angular position, respectively. Of course, each pedal will be monitored by an independent sensor though only one is shown in FIG. 2 for brevity.

Returning to FIG. 1, the wheel speed sensors 30 are an inductive sensor arranged to measure the revolutionary speed of a side shaft. The vehicle speed and longitudinal acceleration can be determined in this way. The wheel speed sensors can also be used to help determine wheel slip ratio for estimating surface-tyre friction coefficient.

The GPS 32 includes an electronic map function and a positioning function for mapping the coordinates of the vehicle onto the electronic map. In this way, the speed, lateral and longitudinal acceleration, and position of the vehicle can be determined. The GPS also includes information such as driving surface inclination for determining if the vehicle is ascending or descending a slope. However this information may alternatively or additionally be provided by a radar or other system of the vehicle.

The accelerometer 34 can be used as an alternative of/in addition to the aforementioned sensors for monitoring longitudinal and lateral acceleration of the vehicle depending on its orientation. The type of accelerometer is not overly important though piezoelectric sensors are used here for illustrative purposes.

The yaw rate sensor 36 detects yaw, or rotation of the vehicle about a vertical axis, for instance during a turn. Again, the specific type of yaw sensor is not overly important, though for illustrative purposes, a tuning fork type sensor is cited here.

A sensor 43 is also provided for detecting a health state of each machine 20, 22. The health state can be in the form of component health, in which case the sensor 43 will take the form of built in test equipment. In addition, the sensor 43 can take the form of a temperature sensor since the temperature of the generator can influence its efficiency.

Figure 3:
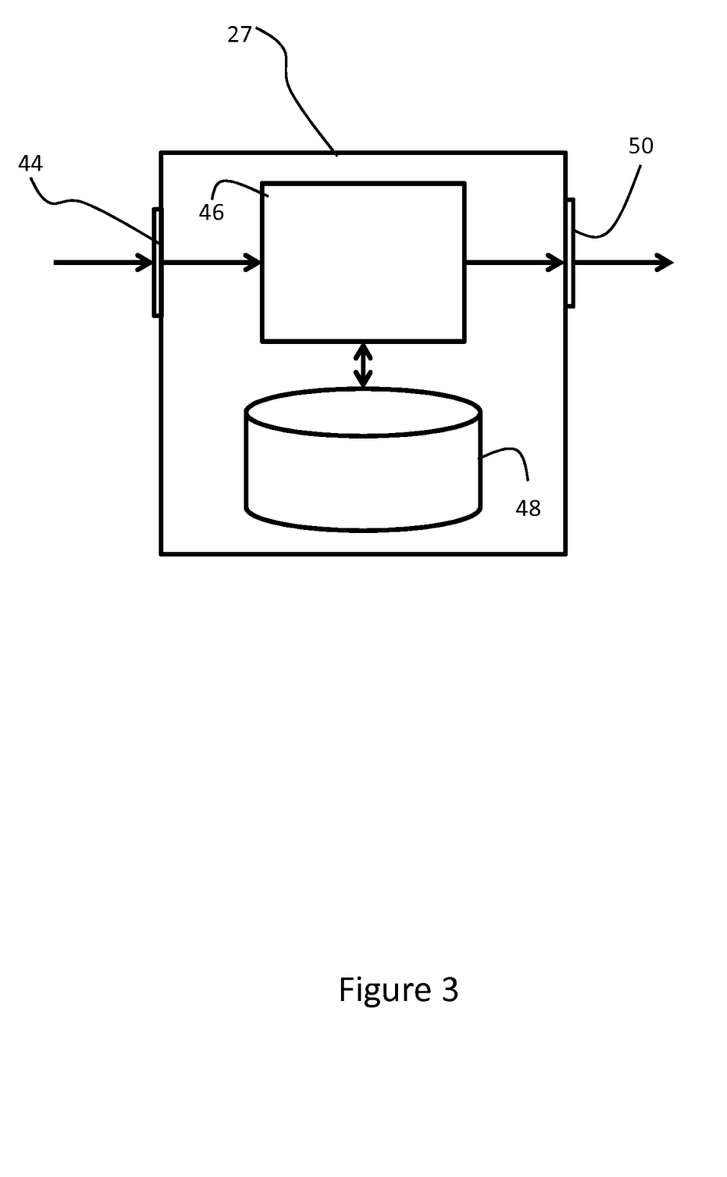
FIG. 3 shows a controller as shown in the braking system in FIG. 1.

With reference to FIG. 3, a single controller 27 is shown to represent both controllers 27 and 27a for brevity. The controller 27 includes an input 44 for monitoring the aforementioned sensors. The controller 27 also includes a processing means 46 and a data store 48 for storing the controller's functionality in the form of electronic data. The data store 48 is a non-volatile memory component. Periodic updates of the various parameters sensed by the sensors are also made to the electronic data stored on the data store 48. The controller 27 also includes an output 50 arranged to send an electronic signal to the front and rear machines 20, 22 (FIG. 1) and the hydraulic brake system. Although the processing means (46) is shown as a single element for simplicity, the processing means may comprise distinct processors, for example of controllers 27, 27a, which handle determining the brake force distribution range and controlling the machines (20, 22) separately.

Operation of the controller is best described with reference to flow chart shown in FIG. 4. The first controller 27 operates by monitoring the various vehicle conditions at step 100. The vehicle conditions include the aforementioned parameters, which include longitudinal acceleration, lateral acceleration, yaw rate, driving surface gradient, weight distribution, surface-tyre friction coefficient, and a driver brake request. In addition, the various operating conditions of the front and rear machines are also monitored at step 102, though by the second controller 27a. These conditions are estimated efficiency, health state of the components, and temperature.

Next, at step 104, vehicle stability is estimated as a normalised parameter. Vehicle stability is based on the monitored vehicle conditions. The stability value is normalised between 0 and 1 though the range is not important and may be a percentage value instead.

Figure 4:
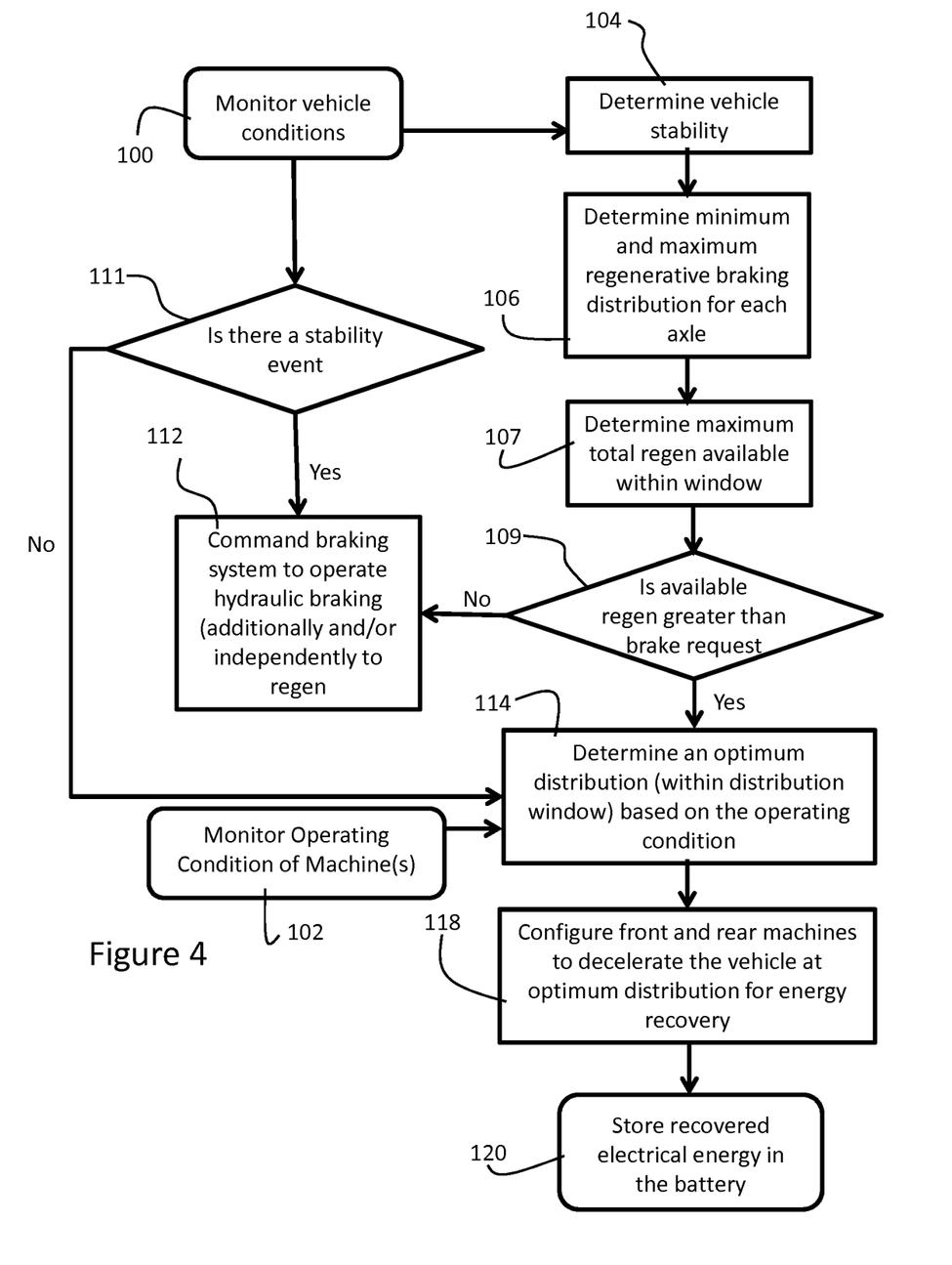
FIG. 4 shows a flow chart of the controller in operation.
Figure 5:
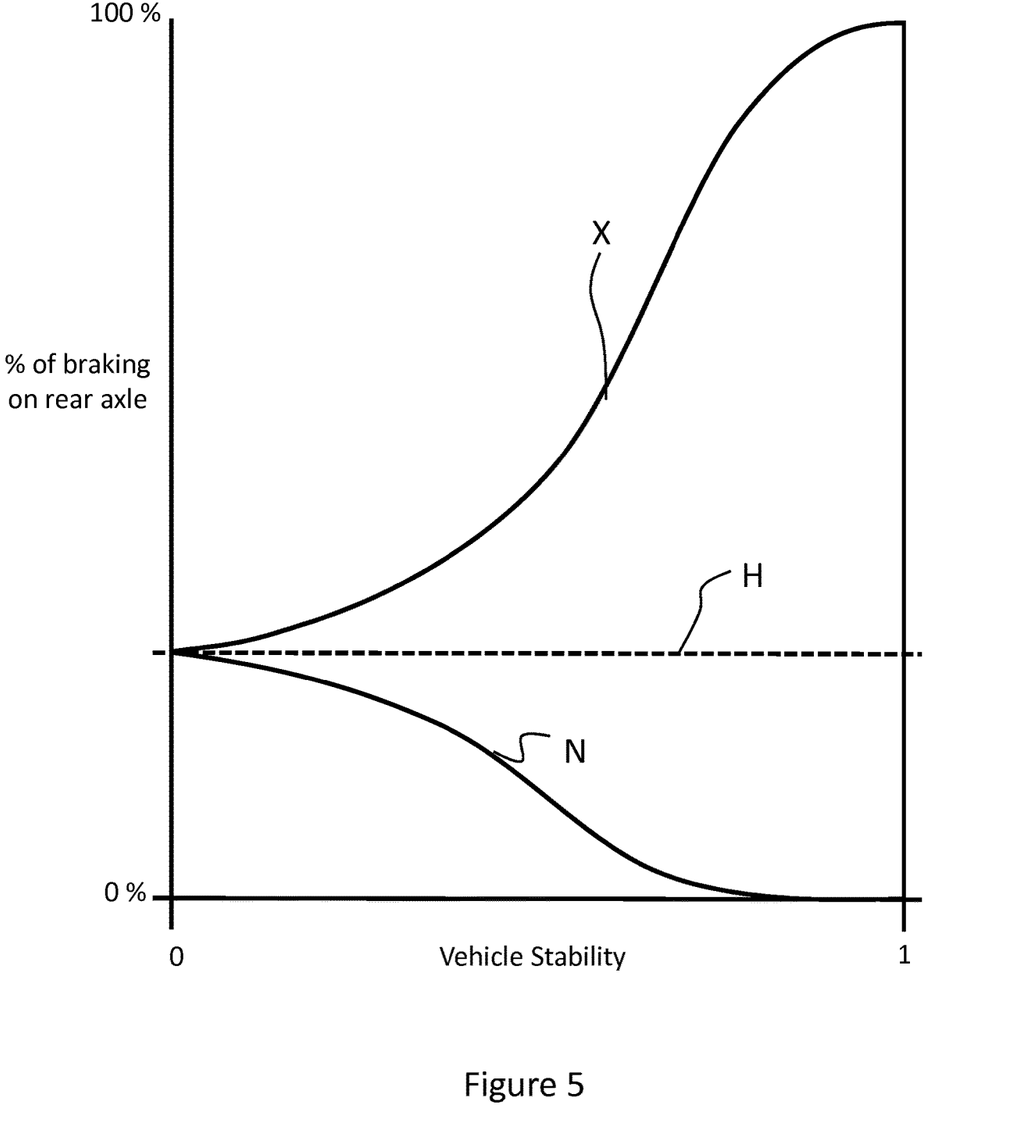
FIG. 5 shows an operating envelope for operation of the braking system from FIG. 1.

With reference to both FIGS. 4 and 5, at step 106, a potential range of brake force distribution is determined. In determining the range, first, the maximum brake force distribution range (X) for an axle is determined, that is, the proportion of braking force which can be applied at each axle. For instance, the controller uses the vehicle conditions to determine the capacity of braking the axle can support before unacceptable wheel slip occurs. Similarly, the controller determines a minimum brake force distribution (N) for the axle. The vehicle conditions are again used for instance by determining the minimum braking force on the axle below which may place too high burden on the other axle for an acceptable wheel slip ratio.

It can be seen from FIG. 5 that the range of regenerative brake force distribution increases with an increase in vehicle stability. In other words, the range is 100% for a vehicle having a normalised stability value of 1. Anecdotally, such a situation would occur at low speeds on a robust driving surface in good weather. The controller configures the range to taper and converge at an installed hydraulic brake force distribution (H), which is shown graphically as a broken line in FIG. 5. The hydraulic brake force distribution occurs at zero vehicle stability.

Figure 6:
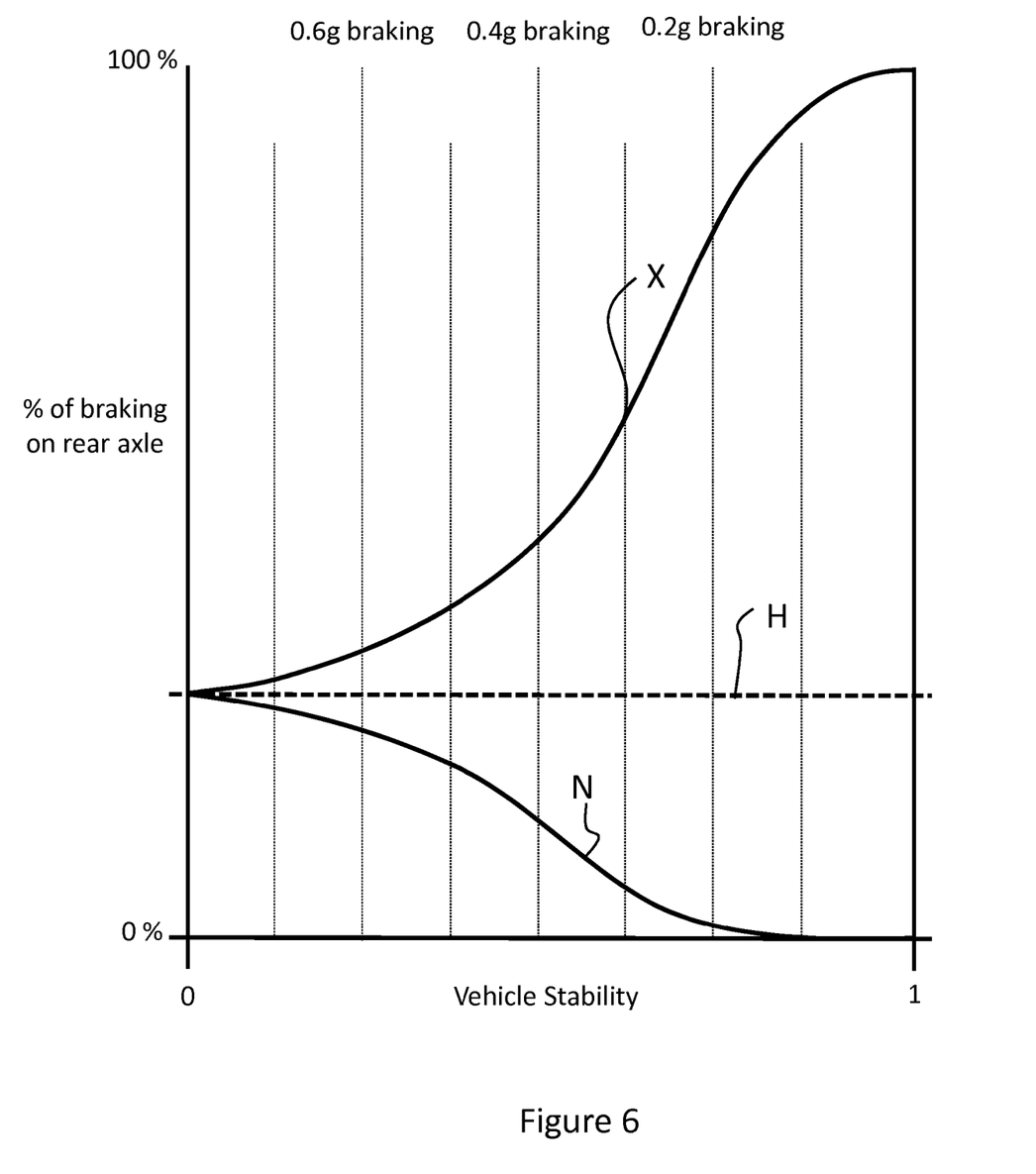
FIG. 6 shows a similar operating envelope to FIG. 5 of the braking system operating with high surface-tyre friction coefficient.
Figure 7:
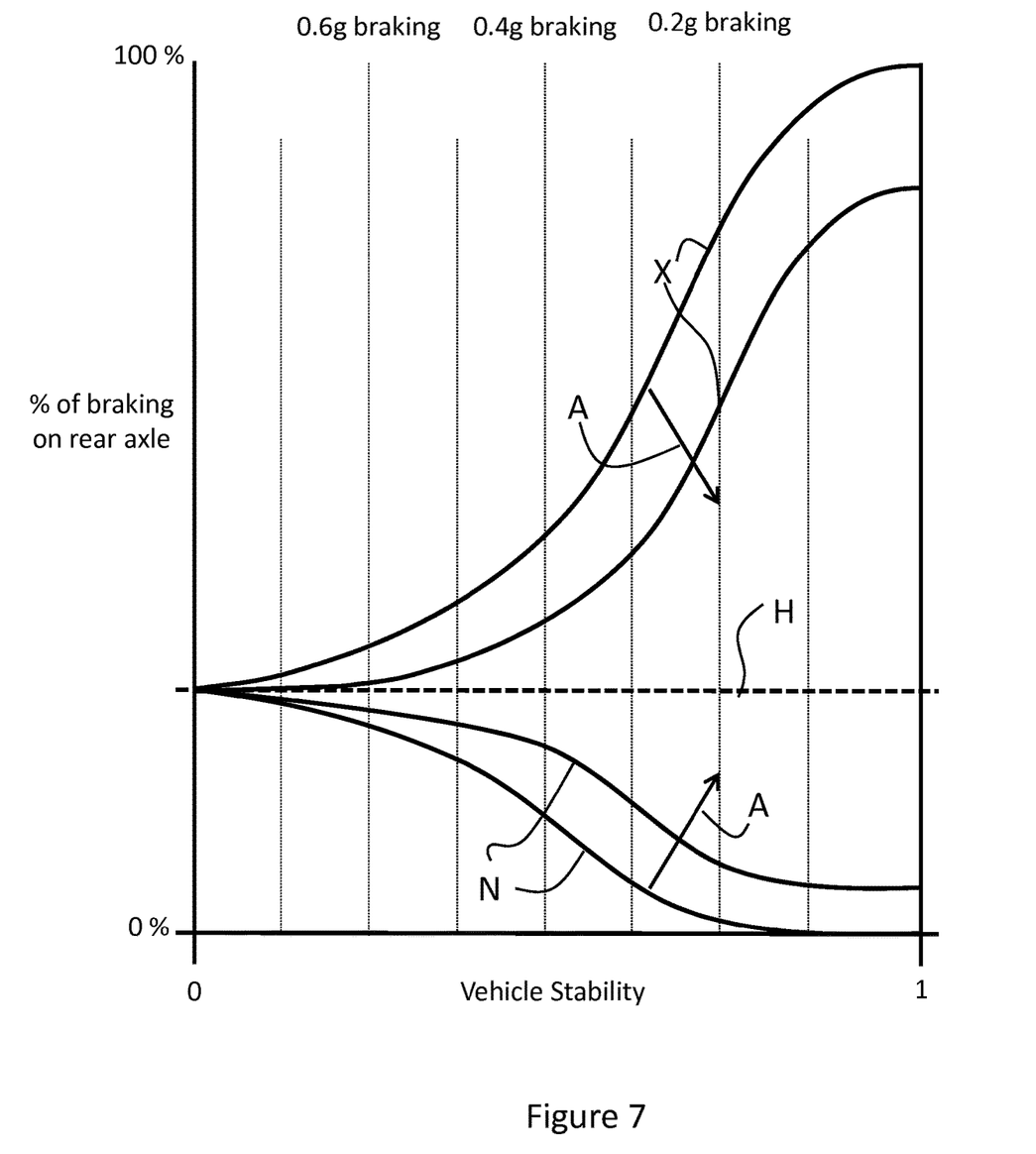
FIG. 7 shows a similar operating envelope to FIG. 6 of the braking system operating with high surface-tyre friction coefficient during a turn.

The impact of various vehicle conditions on the range of braking distributions can be seen with reference to FIGS. 6 and 7

With reference to FIG. 6, an average surface-tyre friction coefficient case (mu~0.8) is shown, where the range has the same profile as shown in FIG. 5. However, the braking forces associated with a given range are listed and are relatively low.

With reference to FIG. 7, the same average surface-tyre friction coefficient has been detected by the controller though in addition, the controller has detected a high degree of yaw, i.e. that the vehicle is in a turn. Accordingly, the controller reduces the minimum and maximum thresholds as signified by arrows (A). Accordingly, a vehicle driving in a straight line and a braking demand of 0.4 g detected has a higher range for selecting the optimum brake force distribution than a case where the vehicle is turning since the vehicle is less stable during a turn.

With further reference to FIG. 4, at step 107, the maximum braking force that both machines 20, 22 can achieve (available window) within the brake force distribution range calculated at step 106 is determined. Then, at step 109, in the event that there is sufficient capacity to retard the vehicle in accordance with the braking demand using regenerative braking alone, then the process continues to step 114. However, if there is insufficient capacity to retard the vehicle using regenerative braking alone, then the controller continues to step 112.

Step 111 also feeds into step 112 for deceleration by hydraulic braking. At step 111, a stability event is detected meaning that hydraulic braking should be used, for instance using ABS. For instance, a stability event could be an unacceptable wheel slip scenario. Such a scenario can be detected using the sensors mounted to each wheel. In a case where the expected wheel speed is, for instance, 10 m/s, and three of the sensors are detecting 10 m/s but one sensor is detecting 2 m/s, the anomaly is likely due to wheel slip of an unacceptable amount. In this way, the process continues to step 112 where the braking system is configured to retard the vehicle by hydraulic braking, or by a hybrid combination of hydraulic and regenerative braking.

The hydraulic brake force distribution is typically about 70% on the front axle and 30% on the rear axle. As the vehicle stability falls, the brake force distribution range converges on this ratio, such that a smooth transition between purely hydraulic and wholly or partly regenerative braking can be achieved as the vehicle stability falls. This is advantageous, for example during a vehicle stability event, where vehicle behaviour given a 70:30 brake force distribution is well-characterised and standard anti-lock braking systems and traction control systems may be provided in the vehicle, and there is no step change in brake force distribution when transitioning from using regenerative braking to hydraulic braking.

At step 114, the controller calculates the actual brake force distribution within the range based on the operating conditions of the respective machine and the braking demand. Ordinarily, the controller may attempt to apply a maximum brake force to the front axle since generators have increased efficiency for increased capacity. However, if the controller determines that the front machine is defective or compromised by the health state of the machine, the controller may select a brake force distribution biased more towards the rear axle such that the rear machine generates more electrical energy from decelerating the vehicle. Other factors may be taken into account too, such as the temperature of the machines, since a hot machine may be relatively less efficient than a cold machine. Furthermore, a hot machine will be less capable of producing power and thus be at increased risk to damaging its components. The controller may thus select an appropriate brake force distribution between the front and rear axles in accordance with the conditions of the machines within the previously-calculated brake force distribution range. The controller may seek to for example to maximise the energy recovered during braking.

Various vehicle conditions can impact the actual distribution selected. For instance, upon detecting the vehicle descending a hill, the weight distribution will shift to the front axle, in which case the regenerative braking distribution will bias to the front axle, which increased utilization can be exploited by the front machine. Conversely, if an uphill ascent is detected, the brake force distribution will bias towards the rear machine, which increased utilization can be exploited by the rear machine.

Accordingly, the functions of maintaining vehicle stability and determining a suitable braking distribution using regenerative braking between front and rear axles can be decoupled. Optionally, the step of determining a brake force distribution range may be carried out by an ABS controller and made available to a separate generator controller. In response to a braking request, the magnitude of the desired braking and the brake force distribution range are made available to the generator controller, which is then free to calculate a desirable brake force distribution within the brake force distribution range based on the conditions of the generator. Within the brake force distribution range, for example, the generator controller can seek an optimal distribution in which energy regeneration is maximised.

Figure 8:
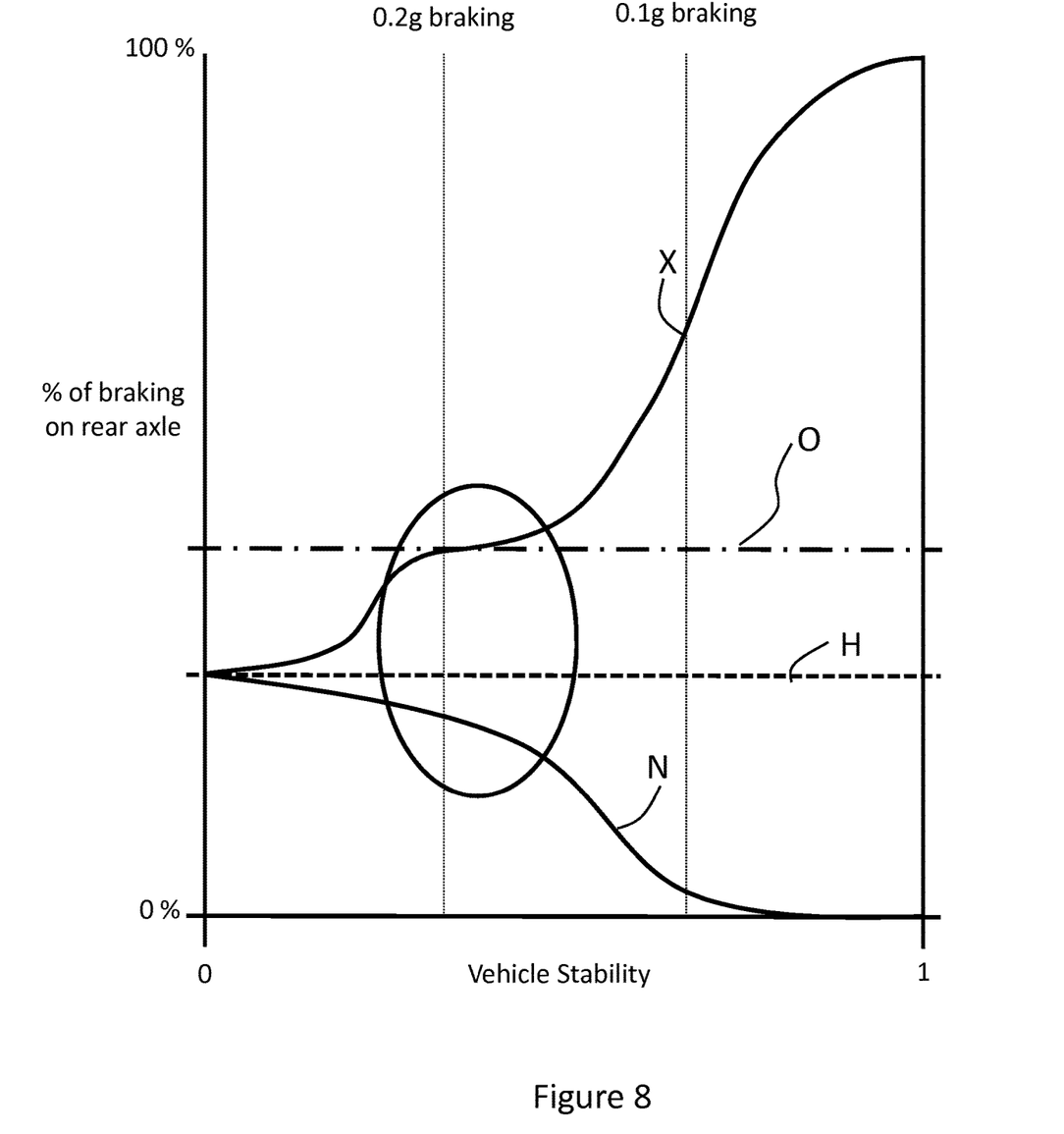
FIG. 8 shows a similar operating envelope to FIG. 6 of the braking system operating with low surface-tyre friction coefficient.

With further reference to FIG. 4, the controller, at step 114, determines an optimum brake force distribution between within the range, such as for those illustrative scenarios described above. An optimum point is shown for a low friction coefficient in FIG. 8. In this case, the optimum brake force distribution to the rear axle is shown by the dot-dash line (O). The circle highlights the case of a brake input of around 0.2 g providing around 45% braking force from the rear axle machine and about 55% braking force from the front axle machine. This distribution is where all four wheels will lock up at the same time for this particular surface/tyre combination, i.e. all four tyre contact patches are working equally hard. On the same surface, the installed brake force distribution would cause the front wheels to lock up first, leading to reduced braking performance. By combining the electric and hydraulic systems to intentionally alter the brake force distribution in this way, vehicle stopping performance is maximised and the risk of an ABS intervention minimised. The hydraulic brake force distribution is at the installed distribution (70:30 front to rear, in this example), and the brake force distribution from the generators is selected such that the combined brake force distribution from the installed hydraulic brakes and regenerative braking remains within the brake force distribution range.

With further reference to FIG. 4, the controller, at step 118, configures the machines to decelerate the vehicle at the selected brake force distribution. The electrical energy generated during the braking event is stored in the battery at step 120. By controlling the available brake force distribution in this way, the energy recovered during braking can be maximised without impairing the stability of the vehicle. In this way, there are many subsequent benefits such as increased vehicle range in the case of an electric vehicle or reduced emissions in the case of a hybrid vehicle.

The invention claimed is:

1. A controller for a braking system for a vehicle, the braking system having an independent generator on respective front and rear axles, the controller comprising:

an input arranged to monitor a vehicle condition and an operating condition of each generator;

a processor arranged to determine a brake force distribution range between the front and rear axles based on the vehicle condition, and in response to a braking demand and the operating condition of each generator, calculate a brake force distribution within the brake force distribution range; and an output arranged to control each generator in accordance with the brake force distribution;

wherein the vehicle condition is a parameter relating to vehicle stability, and wherein the brake force distribution range reduces as the parameter relating to vehicle stability falls; and wherein the brake force distribution range is arranged to taper and converge at an installed hydraulic brake force distribution.

2. The controller of claim 1, wherein the installed hydraulic brake force distribution is distributed with about 70% of a total braking force distributed to the front axle and about 30% of the total braking force distributed to the rear axle.

3. The controller of claim 1, wherein the output is arranged to configure the braking system to retard the vehicle by hydraulic braking in response to the vehicle condition being associated with a stability event.

4. The controller of claim 1, wherein the processor is further arranged to determine an available regenerative braking within the brake force distribution range and is further arranged to send a signal to configure the braking system to retard the vehicle by regenerative braking in response to the available regenerative braking being sufficient for a current braking demand.

5. The controller of claim 4, wherein the output is further arranged to send a signal to configure the braking system to retard the vehicle at least partially by hydraulic braking in response to the available regenerative braking being insufficient for the current braking demand.

6. The controller of claim 1, wherein the vehicle condition is based on one or more parameters selected from a list including longitudinal acceleration, lateral acceleration, yaw rate, driving surface gradient, weight distribution, surface-tyre friction coefficient, and a driver brake request.

7. The controller of claim 1, wherein the generator operating condition is selected from a list including generator efficiency, generator temperature and a health state of the generator.

8. The controller of claim 1, further operable to determine the brake force distribution to maximize recovery of energy during braking.

9. A braking system for a vehicle, the vehicle having front and rear axles, the braking system comprising;

independent generators on the respective front and rear axles for regenerative braking; and a controller comprising: an input arranged to monitor a vehicle condition and an operating condition of each generator;

a processor arranged to determine a brake force distribution range between the front and rear axles based on the vehicle condition, and in response to a braking demand and the operating condition of each generator, calculate a brake force distribution within the brake force distribution range; and an output arranged to control each generator in accordance with the brake force distribution;

wherein the vehicle condition is a parameter relating to vehicle stability, and wherein the brake force distribution range reduces as the parameter relating to vehicle stability falls; and wherein the brake force distribution range is arranged to taper and converge at an installed hydraulic brake force distribution.

10. A method of operating a braking system of a vehicle having independent generators on front and rear axles, the method comprising:

monitoring a vehicle condition and an operating condition of each generator;

determining a brake force distribution range between the front and rear axles based on the vehicle condition; and in response to a braking demand and the operating condition of each generator, calculating a brake force distribution within the brake force distribution range; and controlling each generator in accordance with the brake force distribution;

wherein the vehicle condition is a parameter relating to vehicle stability, wherein the brake force distribution range reduces as the parameter relating to vehicle stability falls, and wherein the brake force distribution range is arranged to taper and converge at an installed hydraulic brake force distribution.

* * * * *